UNITED STATES PATENT OFFICE.

DANIEL AUGUSTE ROSENSTIEHL, OF PARIS, FRANCE, ASSIGNOR TO THE SOCIÉTÉ ANONYME DES MATIÈRES COLORANTES ET PRODUITS CHIMIQUES DE ST. DENIS, OF SAME PLACE.

PROCESS OF PRESERVING FOODS.

SPECIFICATION forming part of Letters Patent No. 589,756, dated September 7, 1897.

Application filed March 15, 1897. Serial No. 627,676. (No specimens.)

*To all whom it may concern:*

Be it known that I, DANIEL AUGUSTE ROSENSTIEHL, of Paris, France, have invented certain new and useful Improvements in Processes for Preserving Alimentary Substances, which improvements are fully described in the following specification.

The process to be described enables the preservation to be effected of alimentary substances the most susceptible to the action of heat by means of temperatures much lower than those at present utilized in the food-preserving industry. The Appert process, the only one actually in use in this industry, requires a temperature of from 115° to 120° centigrade, which is too high in many cases.

Tyndall's process, used in bacteriology, permits (it is true) the use of lower temperatures; but in an industrial point of view it is objectionable for another reason, for it involves a very great expense of time and labor. It is known, in fact, that to obtain the conservation of serum, which may be compared with foods by reason of its alterability, it is necessary consecutively to heat and to cool the substance from twelve to fifteen times at intervals of forty-eight hours. The temperature employed in this case is 58° centigrade, the highest to which this liquid can be heated without coagulating the albumin which it contains.

Utilizing the data in the literature of the subject, attempt has been made to apply the principle of Tyndall's method to the preparation of preserved food. The operation was performed at temperatures between 60° and 90° centigrade and the number of heatings was reduced to three; but beyond 60° centigrade the cooking temperature is reached for a large number of alimentary substances, such as fruits, fish, and meat. Inasmuch as the cooking temperature is that at which the food is radically changed by heat, there is a point which should not be passed, and in this connection the duration of the heating is a factor as important as the temperature. Hence it results that the repetition of the heatings has the effect of overcooking the food and that the loss on one score offsets the gain on another, as compared with the more expeditious and also more certain autoclave process; but to this first reason for a want of success is added another, which is decisive in an industrial view. It is that preservation of the substance is not uniformly insured. Experience shows that the increase of temperature to between 60° and 90° does not allow the number of heatings to be so largely reduced and that even six heatings (within these limits of temperature) do not give assured preservation. Thus the slowness of the treatment, the too advanced cooking, and the incertitude of the result are objections to a use of the Tyndall process. The present process avoids these defects. It is based upon the following observations:

On examining the organisms which cause the loss of preserved food it will be found that it is the vegetable molds for fruits and the bacteria which induce butyric fermentation for meats. For making preserved foods the alimentary substances can consequently be divided into two classes, one of which fruits are the type and meats of the other. The vegetable molds being aërobic, to suppress the presence of the oxygen of the air in the containing vessels is indicated as desirable for the preservation of fruits. These contain a quantity of acid sufficient to assure the inactivity of the lactic and butyric ferments, which develop in meats only from lack of a sufficient quantity of acid to prevent their development.

By providing an acid medium for meats and an airless medium for fruits the conditions most unfavorable to the development of putrid ferments are realized. Moreover, by applying these scientific data to the manufacture of preserved foods experience shows that two advantages are realized besides that of preservation, the first of which is that the temperature of the heatings can be lowered to 45° centigrade, and the second that the alteration of the organoleptic qualities of the foods is reduced to a minimum. The consistence, the color, and the aroma of the preserved food are little different from those of the fresh article.

The acids used in the present process are the fruit acids—citric, tartaric, and malic acid.

They are used either in a pure state or under the form of unfermented juice (as the juice of the lemon) or in a fermented state, (as wine.) I have determined that the proportion which assures a good preservation is also one which is compatible with a good culinary preparation.

The airless medium is obtained for cases of slight delicacy by filling the vessel which contains the food with, say, water for fruits, which water can be saturated with carbonic acid, and for meats with juice or sauces which meet the indicated conditions of acidity.

When a delicate aroma is to be secured, as in certain fruits, truffles, and mushrooms, the space is filled with carbonic acid, a gas whose antiseptic properties aid the action of the heat and the acid medium.

*Examples of Treatment.*

First. To preserve a bleeding meat, (which, it may be said in passing, is impossible by the Appert process:) It may be observed preliminarily that this meat can be placed in the raw state in the containing vessels, (boxes, cans, or other casings,) and the preservation thereof can then be assured by the coöperation of the three factors indicated above; but commerce demands products ready for use. Consequently the meat is roasted slightly and seasoned. The seasoning will include from one to three parts per thousand of one of the above-mentioned acids. The preparation is put in the containing vessel. Then the filling is made with carbonic acid, if the circumstances demand it. The vessel is then hermetically closed and heated from three to six times between 45° and 55° centigrade.

Second. To preserve a fruit: Fruits can be put into the containing vessel in a perfectly raw state. However, use demands for some of them that their consistency should be modified by a slight cooking. The filling medium, which may be water, either plain or sweetened, and may be in either case either acidulated or not acidulated, either charged or not charged with gas, or the medium may be simply carbonic-acid gas. After hermetic sealing the vessel is heated three times to 50° centigrade or five or six times to 45° centigrade.

In operating at the relatively low temperature just indicated and with a small number of heatings it is not alleged that the germs of the ferments are killed, as happens in the Appert process and in that of Tyndall, as this is employed in bacteriology, although it has happened in analyzing bacteriologically certain foods preserved by the present process that a total absence was shown of all visible germs. This, however, is of little consequence in actual use. Suffice it to have determined and practically realized the conditions which prevent these germs from developing.

I claim as my invention or discovery—

The herein-described process of preserving alimentary substances, by repeatedly heating the same in an acid medium under exclusion of air to a temperature between 45° and 55° centigrade, substantially as described.

In witness whereof I have hereunto signed my name in the presence of two subscribing witnesses.

DANIEL AUGUSTE ROSENSTIEHL.

Witnesses:
JULES ARMENGAUD, Jeune,
EDWARD P. MACLEAN.